INVENTOR
AGOSTINO LUNA
BY
ATTY.

INVENTOR.
AGOSTINO LUNA
BY
ATTY 3,349,336
HIGH SPEED ADDER AMPLIFIER OF THE SOLID STATE TYPE

Agostino Luna, Milan, Italy, assignor to Automatic Electric Laboratories, Inc., Northlake, Ill., a corporation of Delaware Filed Nov. 2, 1964, Ser. No. 408,152
Claims priority, application Italy, Dec. 30, 1963, 26,636/63
2 Claims. (Cl. 330—24)

ABSTRACT OF THE DISCLOSURE

Two transistors are connected in a complementary-symmetry common-base amplifier stage with a low-impedance emitter input and a balanced collector output. A bistable bridge circuit having a pair of tunnel diodes is connected to receive control voltage from the collector output. A pair of diodes connected to the collector of each of the transistors limits the control voltage.

The present invention relates to adder amplifiers of the solid state type suitable for being employed particularly in circuits which require high speeds of operation.

As is known, an adder amplifier is a circuit having two input terminals to which are applied two or more currents, and two output terminals from which are drawn a particular voltage of a positive or negative sign accordingly as the algebraic sum of the currents applied to the input terminals is positive or negative, by positive current being meant an incoming current and by negative an outgoing one. These amplifiers are employed in the transformation of an analogical signal to a numerical one.

In the present state of the art, various adder amplifier circuits are known, which are used among other things in telephonic transmission systems of the numerical type. In this specific field of application, the circuits created up to the present have been provided for coding speeds of the order of 1.5 megacycles.

A characteristic of adder amplifiers is that of having a high sensitivity for very small input currents, and in addition of being able to accept much greater currents.

For example, in an application with a binary numerical code in which *n* digits are used for the codification, and therefore with $2^n$ levels of codification, the adder amplifier must be sensitive to permit the codification of the level $2^0=1$ as it is capable of codifying the level $2^{n-1}$. In terms of currents, the adder amplifier must respond to an incoming or outgoing current whose maximum and minimum values are in the ratio $2^{n-1}$.

Another characteristic which is prescribed for adder amplifiers is that the input circuit must disturb as little as possible the circuits from which proceed the currents to be added algebraically, and should therefore ideally present a zero input impedance, as should also be zero the potential difference at the input terminals, for any value of the applied current.

Normally, in adder amplifiers, the input takes place between the base and ground of a transistor connected with the emitter grounded; to the base also comes a negative feedback current through a resistor and two diodes in parallel and connected in opposition (see for example H. Mann, H. M. Straube and C. P. Villars: "A Companded Coder for an Experimental PCM Terminal," in The Bell System Technical Journal of January 1962). The two diodes, in the state of rest, that is in the absence of current applied to the input, are not traversed by any current, and offer a high resistance; the input impedance of the amplifier in this case is the base-emitter resistance of the transistor, except for the slight effect of the negative feedback resistance. The potential of the base cannot coincide with that of the emitter, and therefore the difference of potential between the two input terminals is not zero.

The first difficulty which is encountered, in trying to use the adder amplifiers of the previously mentioned type for application in systems with a high coding speed consists in the fact that the transistors employed in the grounded emitter configuration do not permit the required speed.

Furthermore, in the case in which the circuits for high speed coding systems (of the order of hundreds of megabits/second) make use of tunnel diodes, which furnish signals of limited voltage (of an order of magnitude of 0.5 volt), the necessity is all the more felt, that the input of the adder should present a practically zero resistance and voltage, for any value of the applied current.

The object of the present invention is the realization of an adder amplifier of the solid state type which, in addition to presenting the aforementioned qualities of sensitivity, high loading, low input impedance and zero voltage at the input terminals, has the characteristic of being able to operate at speeds of the order of the hundred megabits per second.

According to the invention, the input stage of the amplifier is constituted of a balanced circuit realized by means of two complementary transistors with the emitter inputs connected in parallel and the bases grounded. A voltage divider inserted between the collectors of the transitsors furnishes the voltage for the following circuit and for the input circuit, which circuit is of the type normally used for "majority" logic.

The further features and details of the invention will we described and illustrated with reference to the appended drawings, in which.

Figure 1:
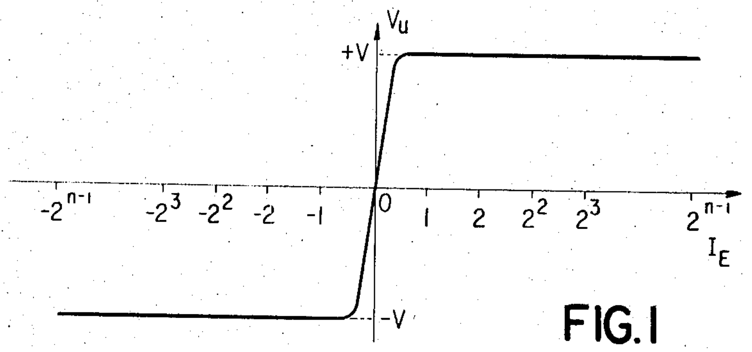
FIGURE 1 represents the desired movement of the output voltage of an adder amplifier as a function of the algebraic sum of the applied currents.

With reference to FIGURE 1, two states of the output voltage $V_u$ of an adder amplifier are indicated as ordinates by $+V$ and $-V$, while the algebraic sums of the currents applied to the input stage are indicated as abscissae by $I_E$. The current $I_E$ is indicated in levels included between $-2^{n-1}$ and $+2^{n-1}$. As is seen, the movement of the characteristic is such that the switching of the output voltage from +V to −V occurs even when the applied current varies by a single unit, that is, from −1 to +1, In the stage shown in FIGURE 2, $I_E$ indicates the algebraic sum of the currents applied to the input P coincident with the two emitters $e_1$ and $e_2$ of the two transistors $T_1$ and $T_2$. These transistors are complementary, that is, one of them $T_1$ is of the PNP type, and the other $T_2$ is of the NPN type, and they determine the balanced input circuit. The balancing is effected through the voltage divider constituted of the resistors $R_3$, $R_4$, $R_5$ and $R_6$ inserted between the equal and opposite voltages +E and −E, and which, having the middle point M connected to ground, the point between $R_5$ and $R_6$ connected to the base $b_1$ of $T_1$ and the point between $R_3$ and $R_4$ connected to the base $b_2$ of $T_2$, takes care of furnishing the exact biasing for the two transistors. The bases $b_1$ and $b_2$ are connected to ground through the by-pass condensers $C_1$ and $C_2$, while the collectors $c_1$ and $c_2$ are fed respectively by the voltages −E and +E through the resistors $R_2$ and $R_1$.

The two collectors $c_1$ and $c_2$ are further joined together through the voltage divider constituted of the resistors $R_7$ and $R_8$, whose central point O remains at zero potential with respect to ground, as will be shown subsequently. In the known majority-logic circuit of FIGURE 4, the symbols DT1 and DT2 indicates two tunnel diodes fed through the resistors $R_9$ and $R_{10}$ from a transformer $T_r$ whose secondary, in series with the aforementioned diodes and resistors, has its center point grounded.

Figure 2:
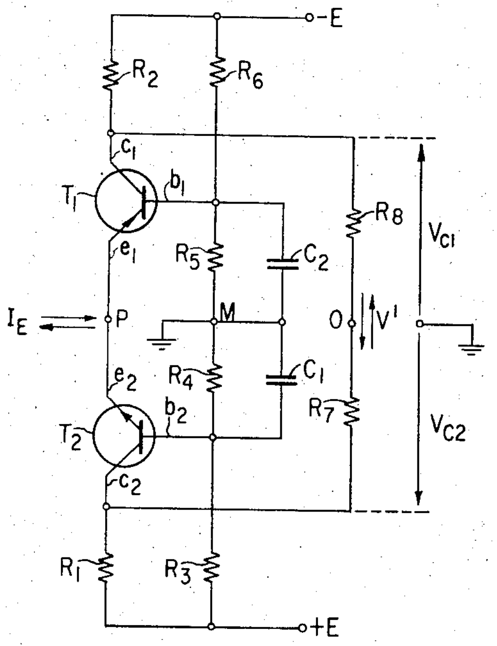
FIGURE 2 represents the input stage of the adder amplifier according to the invention.
Figure 5:
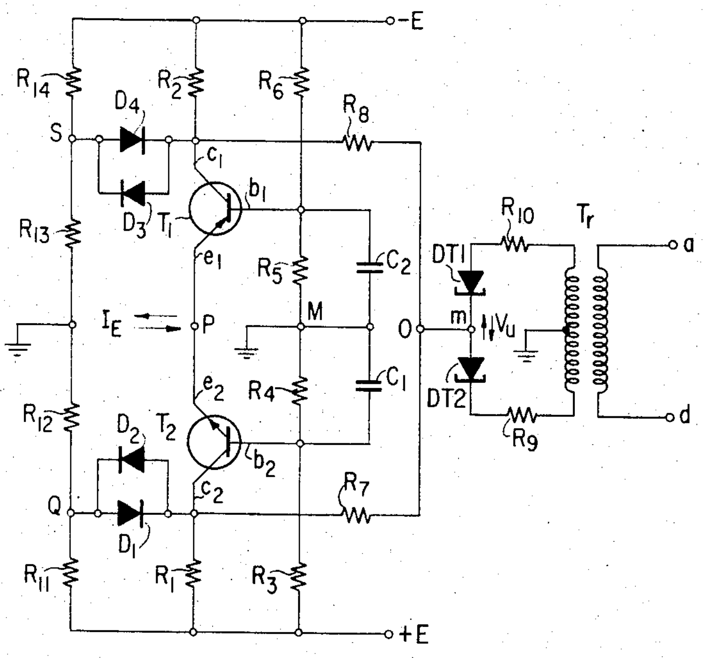
FIGURE 5 represents the circuit of the adder amplifier complete with the input circuit of FIGURE 2, the tunnel diode circuit of FIGURE 4, and protection diodes, according to the invention.

The intermediate point $m$ between DT1 and DT2 is connected to the point O of FIGURE 2 as shown in FIGURE 5. This figure is completed by a protection circuit constituted of two pairs of diodes $D_1$, $D_2$ and $D_3$, $D_4$ connected respectively to the collector $c_2$ of $T_2$ and to the collector $c_1$ of $T_1$, and of a voltage divider constituted of the resistors $R_{11}$, $R_{12}$, $R_{13}$ and $R_{14}$ connected between +E and −E whose mid point is grounded, with the point S biasing the two diodes $D_3$ and $D_4$ and the point Q biasing the two diodes $D_1$ and $D_2$.

With reference to FIGURE 2, the input impedance at the point P is extremely low, both because the input impedance of the emitters $e_1$ and $e_2$ of the transistors $T_1$ and $T_2$ is low, and because the said two emitters are in parallel.

In addition, since the transistors are complementary, because the symmetry of the circuit the potential of the point P is that of the ground, or the difference of potential between the input terminal P and ground is zero.

The two voltages +E and −E are equal in absolute value, as are likewise equal the two resistances $R_1$ and $R_2$; so that the two collector voltages $V_{c1}$ and $V_{c2}$ are equal and opposite, that is $V_{c1}=-V_{c2}$.

If the transistors are not exactly complementary, it is always possible, with an appropriate biasing of the bases, to realize the condition of zero emitter potential while still retaining the equality $V_{c1}=-V_{c2}$, as stated above.

With the transistors biased in a linear zone, upon the application of an external current $I_E$, the condition $V_{c1}=-V_{c2}$ no longer holds true. More precisely, considering an incoming current $I_E$, $V_{c1}$ diminishes while $V_{c2}$ increases in absolute value. On the contrary, if $I_E$ is outgoing, $V_{c1}$ increases while $V_{c2}$ diminishes in absolute value.

Figure 3:
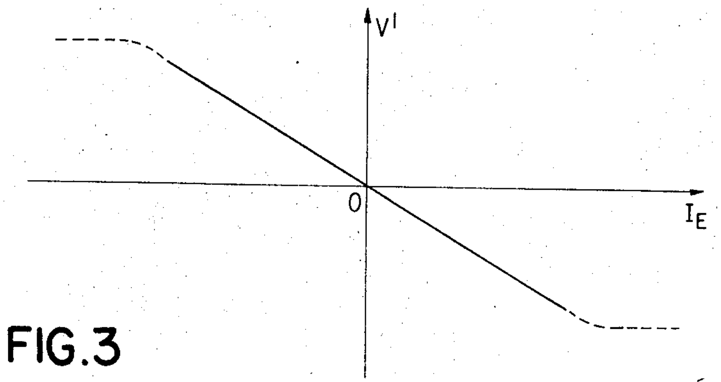
FIGURE 3 shows the movement of the output voltage of the input stage of FIGURE 2 as a function of the algebraic sum of the applied currents.

For values of $I_E$ sufficiently low to make the transistors work linearly $V_{c1}+V_{c2}$ is constant. In the absence of any applied current $I_E$, the voltage V′ between the point O of the voltage divider $R_7$ and $R_8$ and ground is zero, again by virtue of the symmetry of the circuit, and assuming the said two resistances to be equal. Upon the application of a current $I_E$, the voltage V′ assumes a value different from zero, so that we no longer have $V_{c1}=-V_{c2}$. The qualitative movement of V′ upon variations of $I_E$, considering an incoming current as positive, is illustrated in FIGURE 3.

With the circuit described up to this point, the requirements of a very low input impedance, and an input potential rigorously zero with respect to ground, are satisfied.

Figure 4:
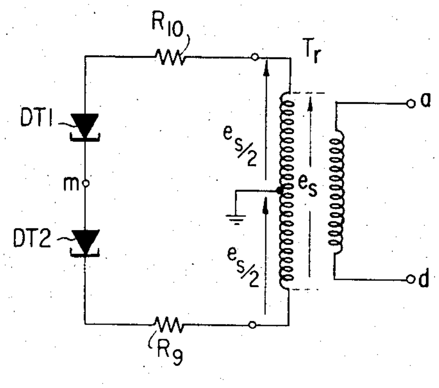
FIGURE 4 shows a known tunnel diode circuit used for majority carrier logic.

To realize the two states of the output voltage of the adder as illustrated in FIGURE 1, with the desired sensitivity, the tunnel diode circuit of FIGURE 4 or another equivalent circuit is provided, piloted by the output signal V′ taken off at the point O.

The operation of this known circuit is as follows:

The feed applied to the terminals $a$ and $d$ may have a sinusoidal form or a square wave form at a digital frequency, and is transferred to the tunnel diodes DT1 and DT2 through the secondary of the transformer $T_r$ with a grounded center tap.

The diodes are selected so as to have a peak current as nearly equal as possible.

During the negative half cycle both of the diodes conduct in the reverse direction, and it is necessary to insert the resistances $R_9$ and $R_{10}$, equal to each other, to limit the reverse current flowing during this half cycle. The point $m$ will be at ground potential, since the transformer, the diodes, and the resistances $R_9$ and $R_{10}$ form the sides of a balanced bridge.

During the positive half cycle both of the diodes conduct in the forward mode, but the point $m$ remains close to ground potential until the current in one or the other diode reaches the peak value.

It is possible to cause one of the two diodes to reach the peak value first by introducing or removing a current at the point $m$. Actually, this current is subtracted from that of one of the diodes and is added to that of the other diodes, causing that one to trigger first into the high voltage state which first reaches the peak value, thus unbalancing the bridge.

If the energizing voltage $e_s$ of the secondary of the transformer $T_r$ is chosen in such a way that only one tunnel diode can reach the high voltage state, the diode which is not triggered is constrained to remain in the low voltage state for all of the remaining positive half cycle.

The voltage at $m$ however is positive or negative accordingly as DT2 or DT1 is triggered respectively, or again, accordingly as the current due to the voltage V′ is incoming or outgoing at $m$. The minimum value of the said current necessary to have a sure decision, depends only on the balancing of the circuit and on the equality of the peak currents of the two tunnel diodes. By selecting tunnel diodes with weak peak currents, and of a value as nearly equal as possible, the value of the current which gives a sure decision may be obtained with an extremely small variation of the voltage V′, thus obtaining the desired sensitivity.

The protection circuit constituted of the diodes $D_1$, $D_2$, $D_3$, $D_4$ limits the excursion of the voltage of the collectors of the transistors $T_1$, $T_2$, thus reducing the current which is applied to the tunnel diodes, in order not to damage them, while at the input P of the adder amplifier, the current may reach any value up to the saturation point of the transistors.

I claim:

1. An adder amplifier comprising:

a balanced input circuit including two complementary transistors, each transistor having an emitter, collector, and base element, said transistors arranged in a complementary-symmetry, common-base configuration, with said emitter elements connected together, a source of operating voltage for said transistors, a voltage divider circuit connected across said source, said divider having a tap connected to each of said collectors and an intermediate center-tap, said taps connected to said collectors being balanced with respect to said center tap and said source, a bistable bridge circuit of the type having a tunnel diode in two legs on opposite sides of its diagonal to which control voltage is applied for changing its state of operation, and said center tap of said voltage divider being connected to said diagonal such that a change of direction of current flow to said emitters changes said control voltage to cause said bridge to change state.

2. An adder amplifier as claimed in claim 1, including limiting means to limit said control voltage, said means being connected to each of said transistor collectors.

References Cited

UNITED STATES PATENTS

| | | | |
|---|---|---|---|
| 3,058,068 | 9/1962 | Hinrichs et al. | 330—24 |
| 3,097,311 | 7/1963 | Tiemann | 307—88.5 |

FOREIGN PATENTS

| | | |
|---|---|---|
| 778,460 | 7/1951 | Great Britain. |

NATHAN KAUFMAN, *Acting Primary Examiner.*

ROY LAKE, *Examiner.*

L. J. DAHL, *Assistant Examiner.*